(12) United States Patent
Matsumura et al.

(10) Patent No.: US 12,377,649 B2
(45) Date of Patent: Aug. 5, 2025

(54) RECORDING DEVICE AND RECORDING METHOD

(71) Applicant: SEIKO EPSON CORPORATION, Tokyo (JP)

(72) Inventors: Tetsuya Matsumura, Nagano (JP); Shunichi Aoyagi, Nagano (JP); Takashi Kobayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 161 days.

(21) Appl. No.: 18/476,405

(22) Filed: Sep. 28, 2023

(65) Prior Publication Data
US 2024/0109286 A1 Apr. 4, 2024

(30) Foreign Application Priority Data

Sep. 30, 2022 (JP) ................. 2022-157647

(51) Int. Cl.
*B41J 2/045* (2006.01)
*B41J 2/21* (2006.01)
(Continued)

(52) U.S. Cl.
CPC ....... *B41J 2/04505* (2013.01); *B41J 2/04586* (2013.01); *B41J 2/2103* (2013.01);
(Continued)

(58) Field of Classification Search
CPC ... B41J 2/21; B41J 2/07; B41J 13/0027; B41J 13/00; B41J 13/02; B41J 29/38; G06K 15/02
See application file for complete search history.

(56) References Cited

U.S. PATENT DOCUMENTS

2021/0187986 A1* 6/2021 Kuriyama ............. B41J 2/2132
2022/0097422 A1   3/2022 Yoshikawa et al.

FOREIGN PATENT DOCUMENTS

EP   0 869 007 B1   6/2005
EP   2 944 474 A2   11/2015
(Continued)

*Primary Examiner* — Thinh H Nguyen
(74) *Attorney, Agent, or Firm* — Global IP Counselors, LLP

(57) ABSTRACT

A recording device, including a transport roller whose circumference length is different from nozzle array length in a transport direction, performs TP recording control to record a group of test patterns, in which a plurality of test patterns including a first patch and a second patch with different positions in the transport direction are arranged in a main scanning direction, and in which an amount of liquid ejected for a boundary area between the first patch and the second patch is different for each test pattern, wherein, in the TP recording control, records a first TP group and a second TP group at different positions in the transport direction onto a medium, transports the medium by a first distance based on the nozzle array length as a transport between the recording of the first patch and the second patch of the TP, and, as a transport between the recording of the second patch of the first TP group and the recording of the first patch of the second TP group, transports the medium by a second distance, which is a difference between an integer multiple of the circumference length and two times the first distance.

6 Claims, 10 Drawing Sheets

(51) Int. Cl.
  *B41J 13/03* (2006.01)
  *B41J 29/393* (2006.01)
(52) U.S. Cl.
  CPC ............ *B41J 13/03* (2013.01); *B41J 29/393* (2013.01); *B41J 2029/3935* (2013.01)

(56) References Cited

FOREIGN PATENT DOCUMENTS

| EP | 4 035 900 A1 | 8/2022 |
| JP | 2022-057288 A | 4/2022 |

\* cited by examiner

RECORDING DEVICE AND RECORDING
METHOD

The present application is based on, and claims priority from JP Application Serial Number 2022-157647, filed Sep. 30, 2022, the disclosure of which is hereby incorporated by reference herein in its entirety.

BACKGROUND

1. Technical Field

The present disclosure relates to a recording device and a recording method.

2. Related Art

A recording device is known to record onto a medium by alternately repeating scanning the medium with a recording head having a nozzle array with nozzles that eject ink and transporting the medium in a transport direction that intersects the scanning direction of the recording head. In such a recording device, there is an error from the design value with respect to transport accuracy, and there are individual differences in such transport errors. Due to the transport errors, streaky density unevenness with relatively high or low density may occur at a boundary area between a band that is an image to be recorded in one scan and a band that is to be recorded in the next scan. To suppress the occurrence of such uneven density, a test pattern is recorded on the medium by two times of scans, and the transport amount of one time between scans is adjusted by evaluating the density of the aforementioned boundary area in the test pattern.

JP-A-2022-57288 discloses, as a related technology, recording an adjustment pattern including multiple patches arranged in the scanning direction of the recording head. According to JP-A-2022-57288, each patch includes a reference pattern recorded by a first recording scan and, after an intervening transport, a displacement pattern recorded by the second recording scan, where the displacement differs from the reference pattern for each patch.

When adjusting the transport amount as described above, the medium is transported a predetermined distance, corresponding to the length of the nozzle array in the transport direction, between the two scans for recording the test pattern. Here, a transport roller that rotates to transport the medium may not be a perfect circle or may be eccentric in its cross-sectional shape. If there is a "transport roller error", which is an error of the transport roller itself, such as a non-perfect circle or eccentricity, the transport amount relative to the rotation amount fluctuates during a single transport roller revolution. Therefore, when the length of the nozzle array differs from the circumference length of the transport roller, test pattern recording results are affected by transport roller error, and it is difficult to obtain a correct adjustment value for the transport amount from the test pattern recording results.

In view of such circumstances, there is a demand for a test pattern that helps to eliminate as much as possible the influence of transport roller error and to obtain a correct adjustment value to suppress uneven density.

SUMMARY

The recording device includes a recording head that has a nozzle array with a plurality of nozzles for ejecting liquid onto a medium, the nozzles being arranged in a predetermined nozzle alignment direction, and that ejects liquid while moving in a first direction that intersects the nozzle alignment direction to perform recording; a transport section that has a transport roller configured to rotate to transport the medium and that transports the medium in a second direction that intersects the first direction; and a control section that controls recording by the recording head and transport by the transport section, wherein: a circumference length of the transport roller is different from a nozzle array length, which is a length of the nozzle array in the second direction and the control section performs TP recording control to record, on the medium, a group of test patterns, in which a plurality of test patterns including a first patch and a second patch with different positions in the second direction are arranged in the first direction and an amount of liquid ejected for a boundary area between the first patch and the second patch is different in the first direction for each test pattern and, in the TP recording control, records a first test pattern group and a second test pattern group, which are the test pattern groups, at different positions in the second direction on the medium, transports the medium by a first distance based on the nozzle array length as a transport between the recording of the first patch and the second patch of the test pattern, and transports the medium by a second distance, which is a difference between an integer multiple of the circumference length and two times the first distance, as a transport between the recording of the second patch of the first test pattern group and the recording of the first patch of the second test pattern group.

A recording method of a recording device, the recording device including a recording head that has a nozzle array with a plurality of nozzles for ejecting liquid onto a medium, the nozzles being arranged in a predetermined nozzle alignment direction, and that ejects liquid while moving in a first direction that intersects the nozzle alignment direction to perform recording; and a transport section that has a transport roller configured to rotate to transport the medium and that transports the medium in a second direction that intersects the first direction, wherein a circumference length of the transport roller is different from a nozzle array length, which is a length of the nozzle array in the second direction, the method comprising: a TP recording step for recording, on the medium, a group of test patterns, in which a plurality of test patterns including a first patch and a second patch with different positions in the second direction are arranged in the first direction, and in which an amount of liquid ejected for a boundary area between the first patch and the second patch is different for each test pattern in the first direction, wherein the TP recording step records a first test pattern group and a second test pattern group, which are the test pattern groups, at different positions in the second direction on the medium, transports the medium by a first distance based on the nozzle array length as a transport between the recording of the first patch and the second patch of the test pattern, and transports the medium by a second distance, which is a difference between an integer multiple of the circumference length and two times the first distance, as a transport between the recording of the second patch of the first test pattern group and the recording of the first patch of the second test pattern group.

DESCRIPTION OF EMBODIMENTS

The following is a description of embodiments of this disclosure with reference to each figure. Each figure is merely an example to explain this embodiment. Since each figure is an example, proportions, shapes, and the shades may not be exact or consistent with each other, and some may be omitted.

1. Brief Description of Device Configuration

Figure 1:
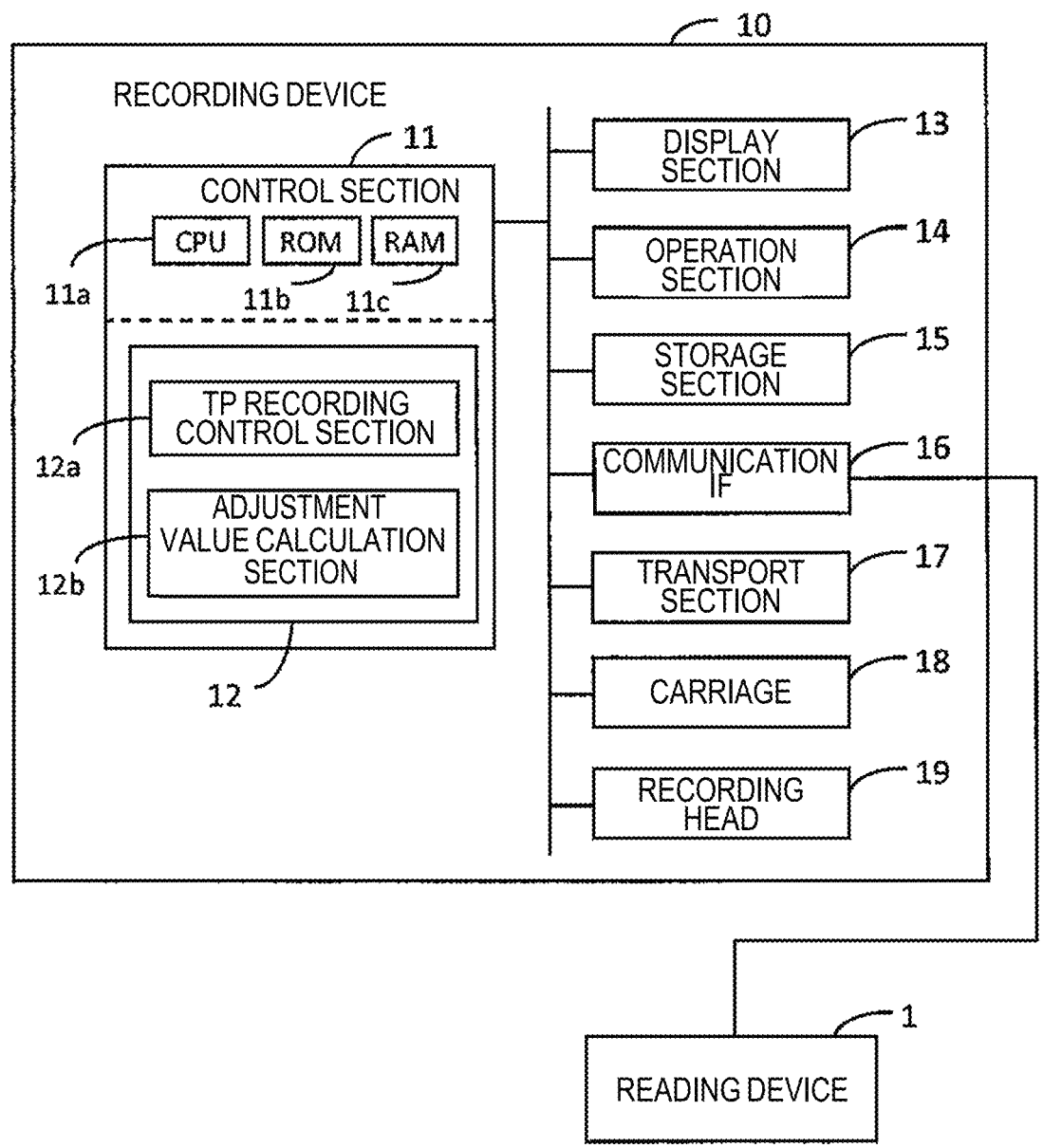
FIG. 1 is a simplified block diagram of a device configuration in this embodiment.

FIG. 1 shows a simplified configuration of a recording device 10 in this embodiment. A recording method is executed by the recording device 10. The recording device 10 is equipped with a control section 11, a display section 13, an operation section 14, a storage section 15, a communication IF 16, a transport section 17, a carriage 18, a recording head 19, and the like. IF is an abbreviation for interface. The control section 11 is composed of one or more ICs having a CPU 11a as a processor, a ROM 11b, a RAM 11c, and the like, and other nonvolatile memory, and the like.

In the control section 11, the processor, that is, the CPU 11a executes calculation processing according to a program 12 stored in the ROM 11b or other memory, by using the RAM 11c or the like as a work area, to realize various functions such as a TP recording control section 12a and an adjustment value calculation section 12b. TP is an abbreviation for test pattern. The program 12 corresponds to a recording control program. The TP recording control section 12a and the adjustment value calculation section 12b are just some of the functions that the recording device 10 realize according to the program 12. The processor is not limited to a single CPU, but may be configured to perform processing using multiple CPUs or hardware circuits such as an ASICs, or CPUs and hardware circuits may work together to perform processing.

The display section 13 is a unit for displaying visual information and is composed of, for example, a liquid crystal display, an organic EL display, or the like. The display section 13 may include a display and a drive circuit for driving the display. The operation section 14 is a unit for accepting operations or input by a user, and is realized, for example, by physical buttons, a touch panel, a mouse, a keyboard, or the like. The display section 13 and the operation section 14 may be collectively referred to as an operation panel of the recording device 10. The operation section 14 as a touch panel is realized as a function of the display section 13. Therefore, the display section 13 may be interpreted as including the operation section 14.

The storage section 15 is, for example, a hard disk drive, a solid state drive, or other memory storage unit. A portion of the memory that the control section 11 has may be considered as the storage section 15. The storage section 15 may be considered as a part of the control section 11.

The communication IF 16 is a general term for one or more IFs that enable the recording device 10 to perform wired or wireless communication with external devices in accordance with predetermined communication protocols, including known communication standards. The communication IF 16 corresponds to a communication section. The external devices are, for example, personal computers (PCs), servers, smartphones, or tablet terminals, and other communication devices. In the example in FIG. 1, the recording device 10 is connected to the reading device 1 via a communication IF 16. The number of external devices to which the recording device 10 is communicatively connected is not limited to one. The reading device 1 is a unit that can read the medium 30 after recording by the recording device 10, and may be a scanner or a colorimeter. The reading device 1 may be a part of the recording device 10.

The transport section 17 is a unit for transporting the medium 30 along a predetermined transport path under control of the control section 11. The transport section 17 is equipped with a transport roller that rotates to transport the medium 30, a motor as a power source for rotation, and the like. The medium 30 is, for example, paper, but it can be any medium that can be subject to recording with liquid, and it can be a material other than paper, such as a film or a fabric.

The carriage 18 is a movement unit that reciprocates along a predetermined main scanning direction under the control of the control section 11 and is powered by a carriage motor (not shown). The carriage 18 has mounted thereon the recording head 19. The main scanning direction corresponds to a "first direction". The recording head 19 is a unit that ejects liquid onto the medium 30 using an inkjet method under the control of the control section 11. Droplets ejected by the recording head 19 are called dots. The liquid is mainly ink.

The recording head 19 is capable of ejecting inks of each color, for example, cyan (C), magenta (M), yellow (Y), and black (K). Of course, the recording head 19 may be capable of ejecting inks of colors other than CMYK or liquid other than ink. Movement of the carriage 18 and movement of the recording head 19 mean the same thing. The carriage 18 and the recording head 19 may be considered collectively as the recording head, or they may be referred to as a recording section.

The recording device 10 is a single printer whose components are integrated into a single unit. Alternatively, the recording device 10 may be a recording system realized by multiple devices or equipment communicatively connected to each other. The recording system includes, for example, an information processing device, which primarily serves as the control section 11, and a printer, which includes the transport section 17, the carriage 18, and the recording head 19 to perform recording under the control of the information process device. In this case, the information process device can be considered a recording control device, an image processing device, or the like. The display section 13, the operation section 14, and the storage section 15 may be a part of the information processing device or the printer, or they may be peripheral devices connected to the information processing device or the printer.

Figure 2:
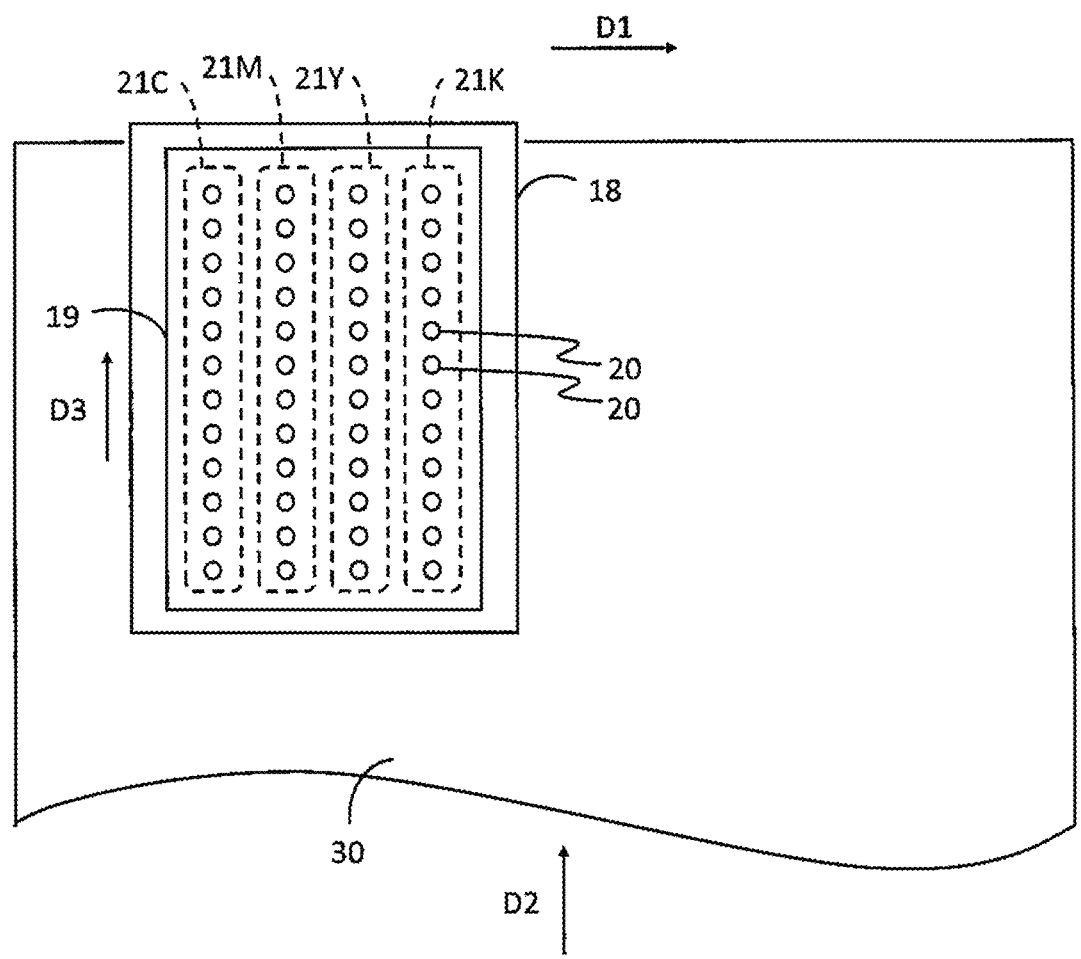
FIG. 2 is a simplified view of a relationship between a recording head and a medium from a viewpoint above.

FIG. 2 shows a simplified view of the relationship between the recording head 19 and the medium 30 as viewed from above. The recording head 19 has a plurality of nozzles 20 capable of ejecting liquid. Each of white circles shown in FIG. 2 is an individual nozzle 20. The direction D2 that intersects the main scanning direction D1 is referred to as a sub-scanning direction D2 or a transport direction D2. The main scanning direction D1 and the transport direction D2 is orthogonal or substantially orthogonal. The transport direction D2 corresponds to a "second direction." The transport section 17 transports the medium 30 from upstream to downstream in the transport direction D2, as indicated by the arrow of the transport direction D2. Upstream and downstream in the transport direction D2 are simply referred to as upstream and downstream.

The recording head 19 has a nozzle array for each liquid type. In FIG. 2, the nozzle arrays 21C, 21M, 21Y, and 21K are shown very simply as the nozzle arrays. Each of the nozzle arrays 21C, 21M, 21Y, and 21K is composed of a plurality of nozzles 20 aligned in a predetermined nozzle alignment direction D3. In the example of FIG. 2, the nozzle alignment direction D3 is parallel to the transport direction D2. However, as a structure of the recording head 19, the nozzle alignment direction D3 may be inclined at an angle to the transport direction D2. In any case, the nozzle alignment direction D3 intersects the main scanning direction D1. A nozzle array includes a plurality of nozzles 20 that are arranged in a row with a constant or nearly constant nozzle pitch, which is the distance between nozzles 20 in the transport direction D2.

The nozzle array 21C is a nozzle array with a plurality of nozzles 20 that eject C ink are arranged. Similarly, the nozzle array 21M is a nozzle array with a plurality of nozzles 20 that eject M ink, the nozzle array 21Y is a nozzle array with a plurality of nozzles 20 that eject Y ink, and the nozzle array 21K is a nozzle array with a plurality of nozzles 20 that eject K ink. The plurality of nozzle arrays 21C, 21M, 21Y, and 21K are arranged along the main scanning direction D1, and are at identical positions with respect to the transport direction D2. The length of the nozzle array in the transport direction D2 is called as a "nozzle array length". The nozzle array length can be interpreted as a distance in the transport direction D2 between the most downstream nozzle 20 and the most upstream nozzle 20. However, if some of nozzles 20 at the downstream end or the upstream end of the nozzle array are not used to eject liquid as a specification, the nozzle array length can be understood as the length of the nozzle array excluding such nozzles 20 at the downstream end or the upstream end that are not used.

The control section 11 causes the recording head 19 to eject ink based on recording data representing an image to be recorded. As is known, the recording head 19 has drive elements for each of the nozzles 20, and by controlling the application of drive signals to the drive elements of each of the nozzles 20 according to the recording data, each of the nozzles 20 ejects or does not eject a dot of the corresponding ink, and an image represented by the recording data is recorded on the medium 30. The recording data is data that specifies whether or not dots are to be ejected for each pixel and each ink color, such as CMYK. Ejection of dots is also referred to as dot-on, and the non-ejection of dots is also referred to as dot-off.

Ejecting liquid from the recording head 19 while the carriage 18 moves the recording head 19 in the main scanning direction D1 is called "scanning" or "pass". The transport of the medium 30 downstream by the transport section 17 between passes is called "paper feed". The control section 11 records a two-dimensional image on the medium 30 by alternately repeating the pass and the paper feed. Movement from one side to the other side along the main scanning direction D1 is called outward path movement, and the movement from the other side to the one side is called return path movement. In addition, a pass by an outward path movement is called an outward pass, and a pass by a return path movement is called a return pass. Recording by using the outward path and the return path is bidirectional recording, and recording by using only one of the outward path and the return path is unidirectional recording. In this embodiment, either bidirectional recording or unidirectional recording may be used.

Figure 3A:
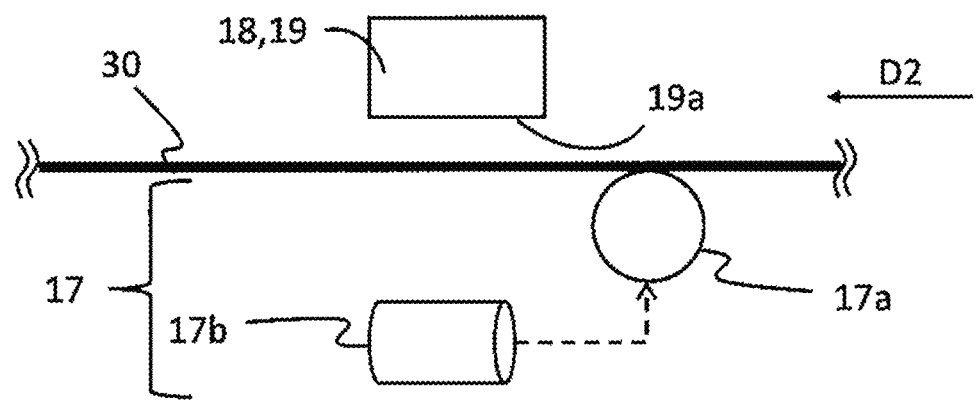
FIG. 3A is a simplified view of a configuration including the recording head and a transport roller from a viewpoint in a direction parallel to a main scanning direction.

FIG. 3A shows a simplified view of a configuration, including the recording head 19 and the transport roller, from the viewpoint in the direction parallel to the main scanning direction D1. The recording head 19 is located above the medium 30. In FIG. 3A, the recording head 19 and the carriage 18 mounted with the recording head 19 are shown as a single unit. The lower surface of the recording head 19 is a nozzle surface 19a. At the nozzle surface 19a, each of the nozzles 20 are opened, and dots are ejected from the nozzle surface 19a onto the medium 30.

The transport section 17 has a transport roller 17a and a transport motor 17b that powers the transport roller 17a in rotation. From the transport motor 17b to the transport roller 17a is connected via a gear wheel train, a belt, or the like (not shown), to transmit the power. The transport roller 17a is located upstream from the recording head 19 and transports the medium 30 by rotating while in contact with the medium 30. The cross-sectional shape of the transport roller 17a is a circle and, as shown in the figure, the circumference of this circle is the circumference length of the transport roller 17a. Although omitted in FIG. 3A, the transport section 17 may have a roller that contacts in the medium 30 and rotates in a driven manner or a platen that supports medium 30.

Figure 3B:
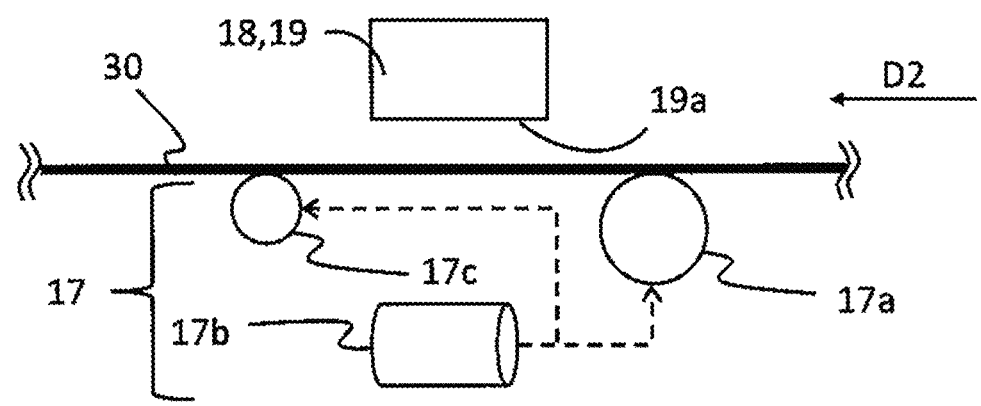
FIG. 3B is a simplified view of a configuration that includes the recording head and the transport roller, which is different from that of FIG. 3A, from a viewpoint in a direction parallel to the main scanning direction.

FIG. 3B shows a different example from FIG. 3A, from the same viewpoint as FIG. 3A. With respect to FIG. 3B, the explanation common to FIG. 3A will be omitted. Multiple transport rollers may be located along the transport direction D2. The transport rollers that have the same position with respect to the transport direction D2 are not referred to as multiple transport rollers in this embodiment. For example, the transport roller 17a may be divided in the main scanning direction D1. In the example of FIG. 3B, the transport section 17 has the transport roller 17a and a transport roller 17c as transport rollers rotated by the transport motor 17b. Between the transport motor 17b and the transport roller 17c are connected by a gear wheel train, a belt, or the like (not shown), to transmit the power. The transport roller 17c is located downstream from the recording head 19, and transport the medium 30 by rotating while in contact with the medium 30. The cross-sectional shape of the transport roller 17c is a circle as shown in the figure, and the circumference of this circle is the circumference length of the transport roller 17c. In the example of FIG. 3B, the transport amount per unit time is designed to be balanced between the transport roller 17a and the transport roller 17c.

In the following, the number of transport rollers may be one, as shown in FIG. 3A, or multiple, as shown in FIG. 3B. However, when there are multiple transport rollers, the multiple transport rollers are considered to be one virtual transport roller, and "circumference length of the transport roller" is the common multiple of the circumference lengths of the multiple transport rollers. The common multiple here can be basically interpreted as the least common multiple, but it does not necessarily have to be the least common multiple. When the example of FIG. 3B is used, "circumference length of the transport roller" is the least common multiple of the circumference length of the transport roller 17a and the circumference length of the transport roller 17c. In this embodiment, the explanation will be continued assuming that the nozzle array length and the circumference length of the transport roller are different from each other. The nozzle array length and the circumference length of the transport roller are known values in each product.

2. From Recording TP Group to Obtaining Adjustment Value

Figure 4:
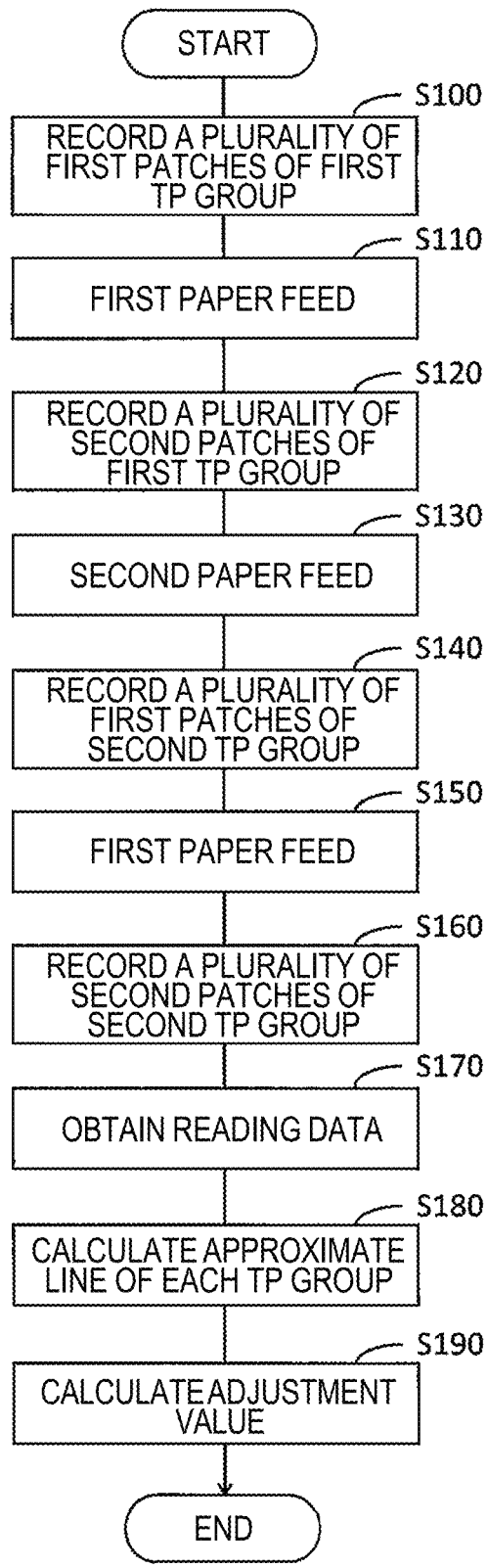
FIG. 4 is a flowchart showing the process performed by a control section in this embodiment.
Figure 5:
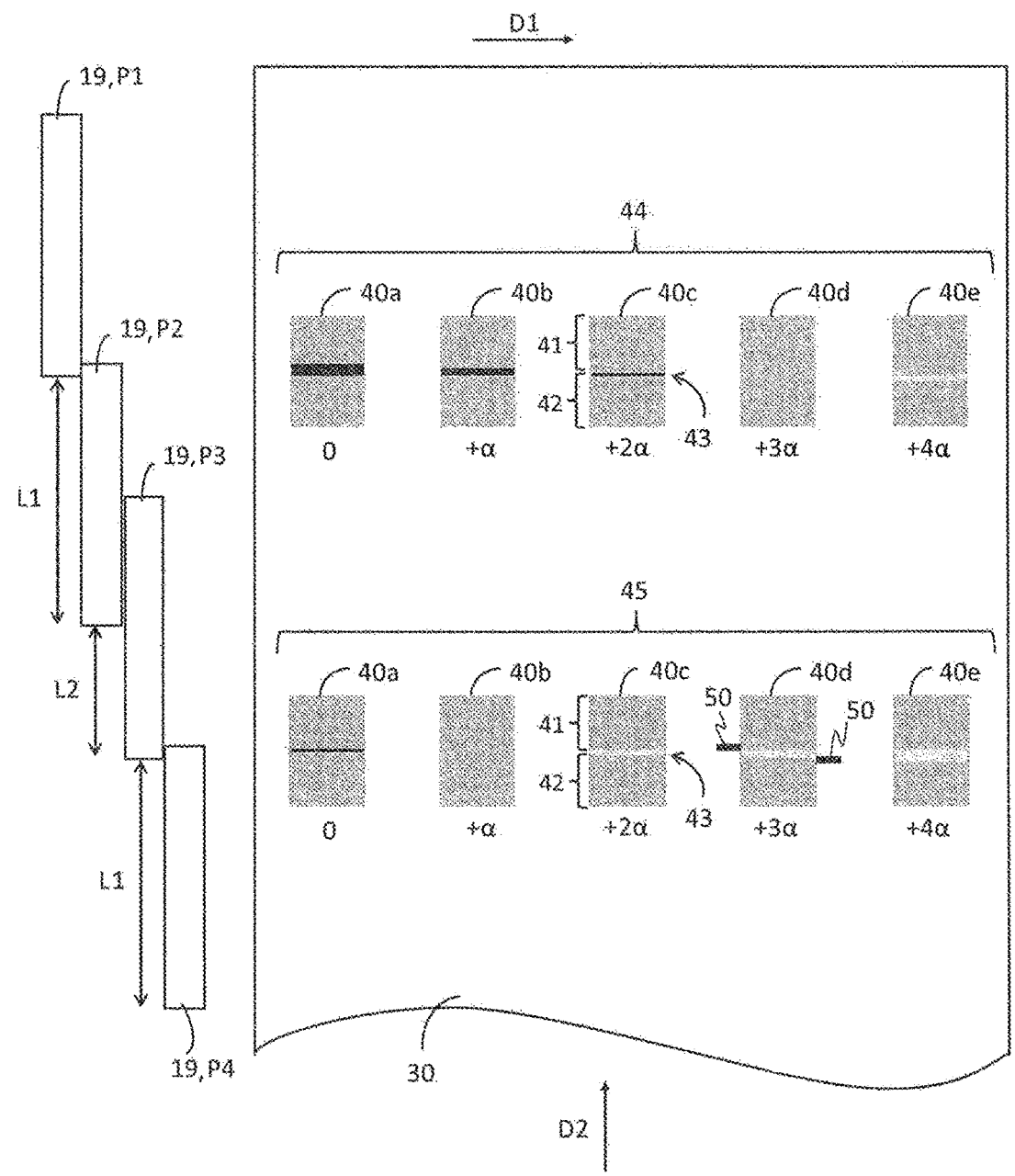
FIG. 5 is a diagram showing a state in which a plurality of TP groups is recorded on the medium by a TP recording control.

FIG. 4 shows a flowchart of the process from recording a TP group to obtaining an adjustment value, which is executed by the control section 11 according to the program 12. Steps S100 to S160 in this flowchart correspond to a "TP recording control" or a "TP recording step" in this embodiment. FIG. 5 shows a plurality of "TP groups" recorded onto the medium 30 by the recording head 19 in the TP recording control, from the same viewpoint as FIG. 2. In FIG. 5, the recording head 19 is shown as a mere rectangle box, and the carriage 18 is omitted.

In step S100, the TP recording control section 12a of the control section 11 controls the carriage 18 and the recording head 19, and causes the recording head 19 to eject ink based on the TP group recording data, which is the recording data representing the TP group, and to record a plurality of first patches 41 of the first TP group 44 on the media 30 in one pass. The TP group recording data is stored in advance, for example, in the storage section 15.

In this embodiment, one TP group is formed by a plurality of TPs aligned in, and separated by spaces in, the main scanning direction D1. In the following, right and left which is viewed from the upstream toward the downstream are simply referred to right and left. In the example of FIG. 5, the first TP group 44 is formed by five TPs 40a, 40b, 40c, 40d, and 40e, which are equally spaced from left to right. Similarly, the second TP group 45 is formed by five TPs 40a, 40b, 40c, 40d, and 40e, which are equally spaced from left to right. Of course, the number of TPs forming one TP group is not limited to five. One TP is formed by the first patch 41 and the second patch 42 at positions that differ in the transport direction D2. In one TP, the patch on the downstream side is the first patch 41, and the patch on the upstream side is the second patch 42. In FIG. 5, the symbols 41 and 42, and a symbol 43 indicating a "boundary area" are omitted from the TPs 40a, 40b, 40d, and 40e except for the TP40c.

The first patch 41 and the second patch 42 are plain images, each recorded with one color of ink. The color of the first patch 41 and the color of the second patch 42 may be the same or different. For simplicity, it is assumed that the first patch 41 and the second patch 42 are recorded with the same color, for example, C ink. Therefore, in FIG. 5, the recording head 19 may be considered as single nozzle array, for example, the nozzle array 21C, which ejects ink of one color.

In the transport direction D2, each of the first patches 41 and the second patches 42 may be band size images, which are recorded using all or substantially all of the nozzles 20 over the nozzle array length. However, the TP should be an image that enables evaluation of the density of the boundary area 43, as will be described later, so each of the first patches 41 and the second patches 42 may be an image of smaller size than the band size in the transport direction D2. In the example in FIG. 5, the first patch 41 is an image recorded by using some of the consecutive nozzles 20 on the upstream side of the nozzle array, and the second patch 42 is an image recorded by using some of the consecutive nozzles 20 on the downstream side of the nozzle array. Thereby, ink consumption amount can be suppressed when recording the TP.

The four recording heads 19 shown in FIG. 5 with their positions shifted along the transport direction D2 are all the same recording head 19. The symbols P1, P2, . . . shown next to the symbol 19 mean which number pass each is. In other words, FIG. 5 shows that the recording head 19 has performed the first to fourth passes P1, P2, P3, and P4, and that the positional relationship between the recording head 19 and the medium 30 in the transport direction D2 is different for each pass P1, P2, P3, and P4 due to the transport of the medium 30. As can be seen from FIG. 5, the plurality of first patches 41 of the first TP group 44 are recorded by the pass P1.

In step S110, the TP recording control section 12a controls the transport section 17 to perform a "first paper feed". The first paper feed in step S110 and step S150 described later is a transport between the recording of the first patch 41 and the recording of the second patch 42 in the TP. The TP recording control section 12a performs the first paper feed by instructing the transport section 17 to transport a "first distance" based on the nozzle array length. The symbol L1 indicates the first distance L1. The first distance L1 based on the nozzle array length is a predetermined one-time paper feed amount. The first distance L1 may be, for example, the nozzle array length itself. However, to avoid gaps in the transport direction D2 between images recorded in each successive pass, and in consideration of an adjustment value using an adjustment value for each TP 40a, 40b, 40c, 40d, and 40e, which will be described later, the first distance L1 is assumed to be shorter than the nozzle array length by a predetermined number of nozzle pitches.

By setting the first distance L1 to a distance that is shorter than the nozzle array length by a predetermined number of nozzle pitches, an upstream end of the first patch 41 and a downstream end of the second patch 42 can easily overlap. If an error in transport accuracy by the transport section 17 when compared to the design ideal, that is, "transport error," is zero, then when the transport section 17 is instructed to transport a certain distance, the transport of the instructed distance will be performed accurately. However, because of possible transport errors, the distance instructed to the transport section 17 may not always be actually achieved. Thus, even when described in this embodiment that to transport by the first distance, or that the transport section 17 is instructed to transport the first distance and perform the first paper feed, and the like, these do not mean that the transport of the first distance is realized exactly. Such an interpretation is applied to a second distance transport and a second paper feed, which will be described later.

In step S120, the TP recording control section 12a controls the carriage 18 and the recording head 19, and causes the recording head 19 to eject ink based on the TP group recording data to record a plurality of the second patches 42 of the first TP group 44 onto the media 30 in a single pass.

In other words, according to FIG. 5, a plurality of the second patches 42 of the first TP group 44 are recorded by the pass P2.

In this embodiment, in one TP group, the amount of liquid ejected for the boundary area 43 between the first patch 41 and the second patch 42 is different for each TP 40a, 40b, 40c, 40d, and 40e aligned in the main scanning direction D1. The boundary area 43 is the area that includes a portion where the first patch 41 and the second patch 42 are closest to each other in the TPs 40a, 40b, 40c, 40d, and 40e, which are aligned in the main scanning direction D1. Specifically, the boundary area 43 is, in each TP 40a to 40e, an area that is, in the transport direction D2, the larger one between an overlap region where the first patch 41 and the second patch 42 overlaps as viewed from the main scanning direction D1 and a gap region between an upstream end of the first patch 41 and a downstream end of the second patch 42. For example, as shown in FIG. 5, in the TP 40a of the first TP group 44, the width in the transport direction D2 of the black streak region corresponds to the width of the boundary area 43, and in the TP 40e of the second TP group 45, the width in the transport direction D2 of the white streak region corresponds to the width of the boundary area 43. Alternatively, the boundary area 43 may be an area, as viewed from the main scanning direction D1, that adds a maximum width of the overlap region where the first patch 41 and the second patch 42 overlap in each TP 40a to 40e and a maximum width of the gap between the upstream end of the first patch 41 and the downstream end of the second patch 42. Each TP in one TP group shall be considered to have the boundary area 43 of the same size at the same location as viewed from the main scanning direction D1.

The 0, +α, +2α, +3α, and +4α shown in FIG. 5 are adjustment values of liquid ejection for the boundary areas 43 for TP 40a, 40b, 40c, 40d, and 40e, respectively. As a specific example, α is a numerical value meaning a predetermined distance. Such adjustment values may or may not be recorded on the medium 30 with the TP near the corresponding TP. Among the TPs 40a, 40b, 40c, 40d, and 40e, the adjustment value for the TP 40a, which is the leftmost TP, is 0. This means that the positional relationship between the first patch 41 and the second patch 42 follows the first distance L1 and is not otherwise adjusted. In other words, in the TP 40a, after the first patch 41 is recorded in the pass P1 and then after the first paper feed in step S110, the second patch 42 is recorded by the pass P2.

When the amount of the overlap portion between the first patch 41 and the second patch 42 in the boundary area 43 increases, the density of the boundary area 43 increases and is easily seen as a dark streak of unevenness. On the other hand, when the amount of the overlap portion in the boundary area 43 is too small, or when there is no overlap portion and a gap is created, the density of the boundary area 43 will decrease and will be easily seen as a bright streak of unevenness. Hereinafter, the dark streak of unevenness compared to the surrounding color will be referred to as a "black streak", and the bright streak of unevenness compared to the surrounding color will be referred to as a "white streak". The black streak does not necessarily have to be black, and similarly, the white streak does not have to be white.

In FIG. 5, the adjustment value of the TP 40b recorded to the right of the TP 40a is +α. This means that after the pass P1 in which the first patch 41 was recorded, the second patch 42 was recorded in the pass P2 so that a paper feed of "first distance L1+α" was executed. Similarly, the adjustment value of the TP 40c recorded to the right of the TP 40b is +2α. This means that after the pass P1 in which the first patch 41 was recorded, the second patch 42 was recorded in the pass P2 so that the paper feed of "first distance L1+2α" was executed. The adjustment value of the TP 40d recorded to the right of the TP 40c is +3α. This means that after the pass P1 in which the first patch 41 was recorded, the second patch 42 was recorded in the pass P2 so that the paper feed of "first distance L1+3α" was executed. The adjustment value of the TP 40e recorded to the right of the TP 40d is +4α. This means that after the pass P1 in which the first patch 41 was recorded, the second patch 42 was recorded in the pass P2 so that the paper feed of "first distance L1+4α" was executed.

Figure 6:
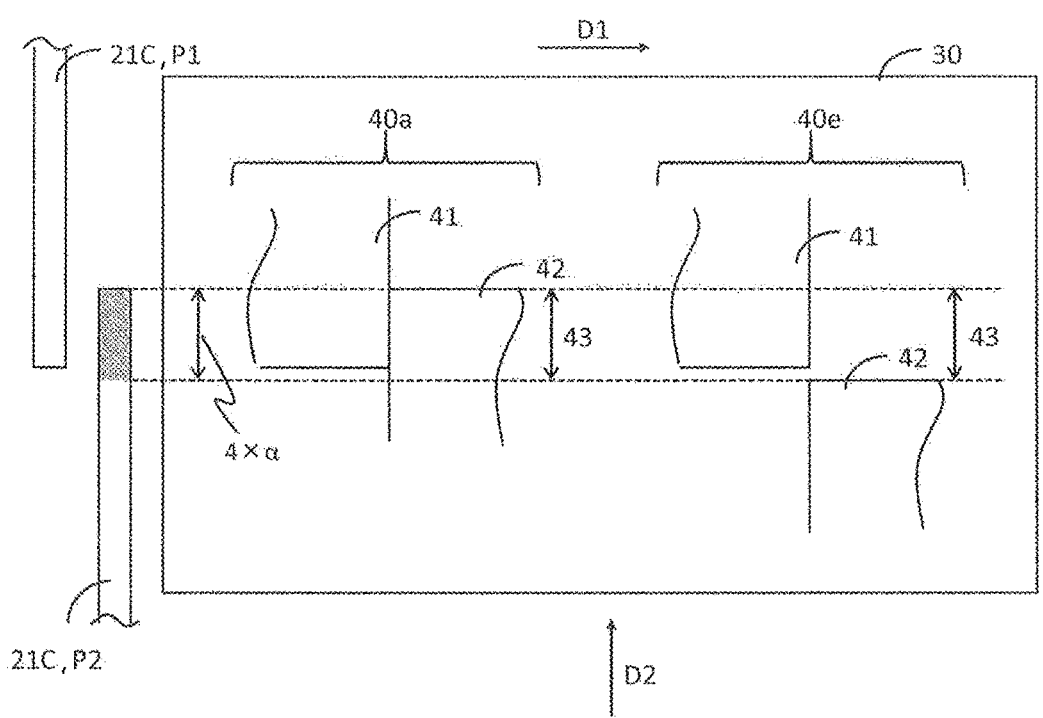
FIG. 6 is a diagram explaining the recording method of a second patch.

FIG. 6 shows an enlarged view of a nozzle array and a part of the medium 30 to explain how the plurality of the second patches 42 are recorded in step S120. In FIG. 6, the nozzle array 21C as a nozzle array is simply shown by an elongated rectangle in the transport direction D2. Due to space limitations, in FIG. 6, only the TPs 40a and 40e are partially shown from among the TPs 40a, 40b, 40c, 40d, and 40e in the first TP group 44. In FIG. 6, the first patch 41 and the second patch 42, which form a single TP, are shown shifted in the main scanning direction D1, in order to prioritize ease of viewing. Actually, the first patch 41 and the second patch 42 forming a single TP are recorded at the same position in the main scanning direction D1. The meanings of the symbols P1 and P2 appended to the nozzle array 21C are the same as in FIG. 5.

In the pass P2, the TP recording control section 12a changes the usage range of nozzles 20 for each TP's second patch 42, and records the second patches 42 of each TP 40a, 40b, 40c, 40d, and 40e. In other words, for the second patch 42 of TP40a with an adjustment value of 0, it is sufficient that the second patch 42 be recorded by ink ejection using a range of nozzles including the most downstream nozzle 20 from amongst the plurality of nozzles 20 spanning the length of the nozzle array. On the other hand, in the recording of the second patch 42 of TPs 40b, 40c, 40d, and 40e, the range of unused nozzles is set differently for each of the TPs 40b, 40c, 40d, and 40e, to a downstream range of the nozzle array 21C including the most downstream nozzle 20, in accordance with the adjustment values of +α, +2α, +3α, and +4α. Then, it is sufficient that the second patch 42 of each TP 40b, 40c, 40d, and 40e be recorded by ejection of ink in the same pass P2, using a range of nozzles that are not unused, that differs for each of the TPs 40b, 40c, 40d, and 40e.

For example, the second patch 42 of the TP 40e with the adjustment value=+4α must have its downstream edge shifted upstream by a distance equal to 4×α compared to the downstream edge of the second patch 42 of the TP 40a with adjustment value=0. Therefore, in the course of pass P2 during the period of recording the second patch 42 of TP 40e, the control section 11 sets the unused nozzle range corresponding to 4×α in the transport direction D2, to the downstream range of the nozzle array 21C that includes the most downstream nozzle 20. In FIG. 6, the unused nozzle range in the course of the pass 2 during the period of recording the second patch 42 of the TP 40e, is illustrated in gray. Although not shown in the figure, the TP recording control section 12a expands such unused nozzle range step by step upstream when recording the second patch 42 for each TP 40b, 40c, 40d, and 40e.

According to this method of recording the second patch 42, second patches 42, which have different positional relationships in the transport direction D2 to the corresponding first patch 41, can be recorded in a single pass P2. In other words, as shown in FIG. 6, it is possible to record the TP 40*a*, which has a relatively large amount of liquid ejection for the boundary area 43 between the first patch 41 and the second patch 42, and the TP 40*e*, which has a relatively small amount of liquid ejection for the boundary 43 between the first patch 41 and second patch 42. As can be seen from the previous explanations, TPs with an adjustment value close to 0 tend to generate black streaks on the boundary 43 because the amount of liquid ejection to the boundary area 43 is large and TPs with a larger adjustment value tend to generate white streaks on the boundary area 43 because the amount of liquid ejection to the boundary area 43 is smaller. As can be seen from FIG. 6, the boundary area 43 of the TP 40*a* and the boundary area 43 of the TP 40*e* are common areas for the TP 40*a* and the TP 40*e* in the transport direction D2. The boundary area 43 shown in FIG. 6 is a specific example of an area, as viewed from the main scanning direction D1, that adds the maximum width of the overlap region where the first patch 41 and the second patch 42 overlap in each TP 40*a* to 40*e* and the maximum width of the gap between the upstream end of the first patch 41 and the downstream end of the second patch 42. Furthermore, the boundary area 43 shown in FIG. 6 can be said to be an area corresponding to the difference between the range of the nozzles used when recording the second patch 42 in the TP 40*a* and the range of nozzles used when recording the second patch 42 in the TP 40*e*.

In step S130, the TP recording control section 12*a* controls the transport section 17 to perform a "second paper feed". The second paper feed is a transport between the recording of the second patch 42 in the first TP group 44 and the recording of the first patch 41 of a second TP group 45. The TP recording control section 12*a* instructs the transport section 17 to perform the second paper feed by instructing the transport section 17 to transport a "second distance," which is a difference between n times the transport roller circumference length and 2 times the first distance L1. The symbol L2 in FIG. 5 indicates the second distance L2.

"n" is an integer equal to or higher than 1 and is the smallest integer that satisfies the following relationship:

(transport roller circumference length×*n*)−(first distance *L*1×2)>0

Therefore, if (circumference length of the transport roller)>(first distance *L*1×2)

then *n*=1.

If, (the first distance *L*1×2)>(the circumference length of the transport roller)>(the first distance *L*1)

then *n*=2.

If, (circumference length of transport roller)<(first distance *L*1)

then *n* is an integer of 3 or more.

In step S140, the TP recording control section 12*a* controls the carriage 18 and the recording head 19 to cause the recording head 19 to eject ink based on the TP group recording data to record a plurality of first patches 41 of the second TP group 45 onto the media 30 in a single pass. According to FIG. 5, the plurality of first patches 41 of the second TP group 45 are recorded by the path P3.

In step S150, the TP recording control section 12*a* controls the transport section 17 to perform the first paper feed. In step S160, the TP recording control section 12*a* controls the carriage 18 and the recording head 19 to cause the recording head 19 to eject ink based on the TP group recording data to record a plurality of second patches 42 of the second TP group 45 onto the media 30 in a single pass. According to FIG. 5, the plurality of second patches 42 of the second TP group 45 are recorded by the pass 4.

The explanation of steps S140 to S160 applies similarly to steps S100 to S120. In this way, the process of recording the second TP group 45 by the pass P3, one first paper feed, and the pass P4, in steps S140-S160, is not different from the process of recording the first TP group 44 by the pass P1, one first paper feed, and pass P2, in steps S100-S120, except for the recording position of the TP group on the media 30 in the transport direction D2. According to steps S100 to S160, the first TP group 44 and the second TP group 45 are recorded on the medium 30 at different positions in the transport direction D2. The total distance of the first paper feed, the second paper feed, and the first paper feed in steps S110, S130, and S150 is n times the circumference length of the transport roller.

If there is no transport error, there will be no or little difference between the recording results of the first TP group 44 and the second TP group 45 on the medium 30. In reality, however, there is a difference between the recording result of the first TP group 44 and the result of the second TP group 45 due to the transport errors. In the example in FIG. 5, in the first TP group 44, a black streak occurs in the boundary areas 43 of the TPs 40*a*, 40*b*, and 40*c*, a white streak occurs in the boundary area 43 of the TP 40*e*, and almost no black streak or white streak occurs in the boundary area 43 of the TP 40*d*. On the other hand, in the second TP group 45, a black streak occurs in the boundary area 43 of the TP 40*a*, a white streak occurs in the boundary areas 43 of the TPs 40*c*, 40*d*, and 40*e*, and almost no black streak or white streak occurs in the boundary 43 of the TP 40*b*.

In the example shown in FIG. 5, the second TP group 45 has a stronger tendency to generate the white streaks as a whole than the first TP group 44. From this, it can be inferred that the actual paper transport amount by the first paper feed in step S150 was greater than the actual paper transport amount by the first paper feed in step S110. As described above, the transport roller may not be perfectly circular or may be eccentric in its cross-sectional shape. "Transport roller errors" such as not being a perfect circle or being eccentric are one of the causes of transport errors. In particular, transport roller errors cause variations in the actual transport amount in the first paper feed.

Figure 7:
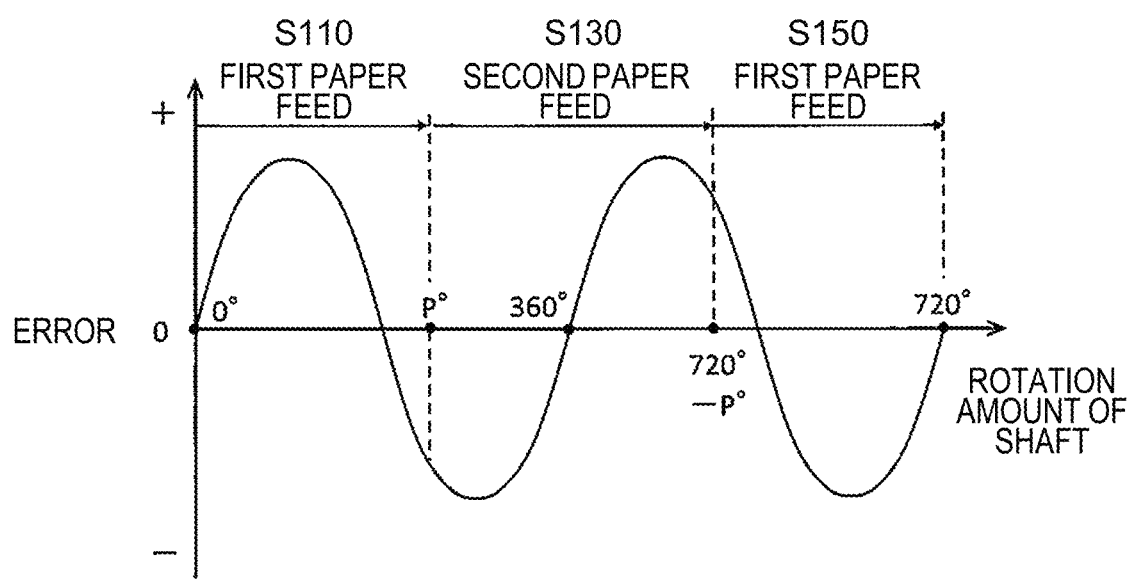
FIG. 7 is a graph showing an error in a transport amount relative to a rotation amount of the transport roller when there is a transport roller error.

FIG. 7 shows a graph of errors in transport amount relative to rotation amount of the transport roller, when there is a transport roller error. In FIG. 7, the horizontal axis is the rotation amount of the transport roller shaft, and the vertical axis is the error in transport amount caused by the transport roller error. Ideally, in terms of design, transport amount should also be constant for a constant transport amount for a constant rotation of the transport roller. However, in practice, due to transport errors, the transport amount for a given rotation amount varies more or less than the designed value within one cycle of one transport roller rotation. Therefore, even if the transport section 17 is instructed to feed the paper a constant distance of the first distance L1, if the transport roller starts rotating at different phases, then the amount actually transported by said instruction will be different from the instructed amount. In a configuration with a plurality of transport rollers as shown in FIG. 3B, the error waveform shown in FIG. 7 should be interpreted as a composite waveform of the errors in the transport amount caused by the transport roller errors of all of the plurality of transport rollers.

In the explanation of FIG. 7, the following relationship is assumed to be true:

(first distance L1×2)>(circumference length of transport roller)>(first distance L1)

and n=2.

The angle P° is, by design, the rotation amount of the transport roller shaft corresponding to the transport of the first distance L1 and, in step S110, the TP recording control section 12a takes the current angle of the transport roller shaft as the standard angle of 0° and rotates it by angle P° from there to perform the first paper feed. This corresponds to the transport instruction for the first distance L1. In the example in FIG. 7, the positive error is predominant in the range angle 0° to angle P°, thus, as a result of step S110, the actual transport amount is more than the first distance L1, contrary to the example in FIG. 5.

If n=2, the total transport amount in steps S110, S130, and S 150 is twice the circumference length of the transport roller, that is, two revolutions of the transport roller. Therefore, in step S130, the TP recording control section 12a performs the second paper feed by rotating the transport roller shaft from angle P° at that position to angle (720°-P°). This corresponds to the transport instruction for the second distance L2. In step S150, the TP recording control section 12a performs the first paper feed by rotating the transport roller shaft from angle (720°-P°) at that time to angle 720°. This corresponds to the transport instruction for the first distance L1. In the example in FIG. 7, the negative error is predominant in the range angle (720°-P°) to angle 720°, thus, as a result of step S150, the actual transport amount is less than the first distance L1, contrary to the example in FIG. 5.

As can be seen from FIG. 7, the second paper feed in step 130 results in the opposite relationship to the errors in the first paper feed in steps S110 and S150, and they can cancel each other out. In this embodiment, the first TP group 44 with boundary area 43, which is affected by the error in the transport amount generated in the first paper feed of step S110, and the second TP group 45 with boundary area 43, which is affected by the error in the transport amount generated in the first paper feed of step S150, are recorded onto the medium 30. This makes it possible to evaluate both the first TP group 44 and the second TP group 45. As a result, it is easier to obtain appropriate adjustment values without the influence of the transport roller errors.

In step S170, the adjustment value calculation section 12b of the control section 11 obtains reading data of the first TP group 44 and the second TP group 45. In other words, the reading device 1 reads the medium 30 on which the first TP group 44 and the second TP group 45 are recorded and outputs reading data as a result of the reading to the recording device 10. Thereby, the control section 11 can obtain the reading data of the first TP group 44 and the second TP group 45. The format of the reading data output by the reading device 1 is not limited, and can be red, green, and blue (RGB) color image data, monochrome luminance data, or colorimetric values from other color coordinate system.

In step S180, the adjustment value calculation section 12b obtains the streak density for each TP 40a, 40b, 40c, 40d, and 40e from the reading data of the first TP group 44, and calculates an approximate line of these streak densities. Similarly, the adjustment value calculation section 12b obtains the streak density for each TP 40a, 40b, 40c, 40d, and 40e from the reading data of the second TP group 45, and calculates an approximate line of these streak densities.

Figure 8A:
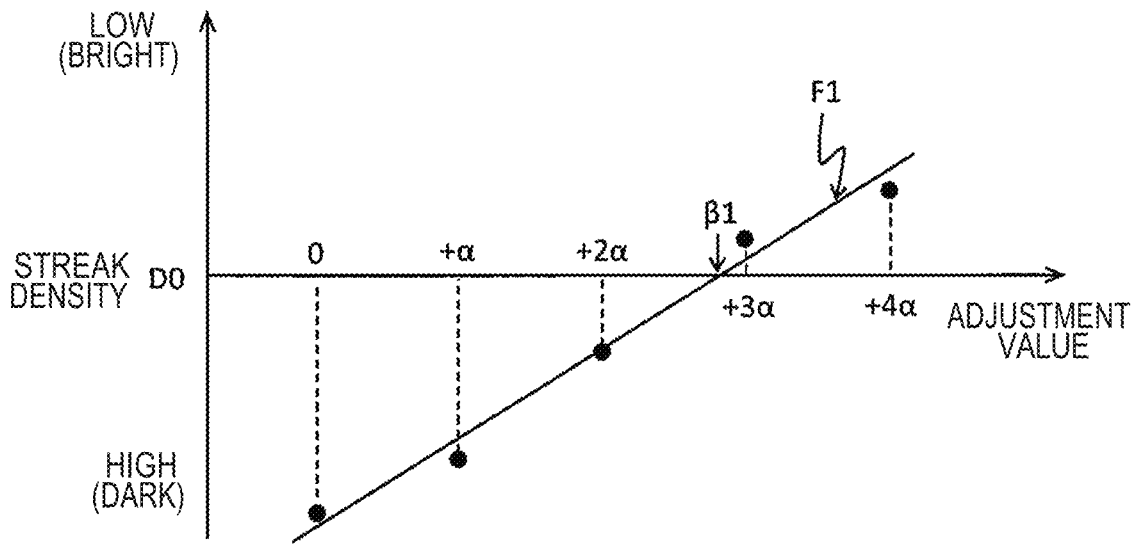
FIG. 8A is a graph showing a streak density obtained from the reading results of a first TP group.

FIG. 8A shows the streak density obtained from the reading result of the first TP group 44 recorded on the medium 30. According to FIG. 8A, the streak density for each adjustment value 0, +α, +2α, +3α, and +4α, that is, for each TP 40a, 40b, 40c, 40d, and 40e, is plotted by black circles in a graph with the vertical axis being streak density and the horizontal axis being adjustment value. Streak density is the brightness of the boundary area 43 for each TP. Streak density may be interpreted as the difference between the density of the patch outside the boundary area 43 and the density of the boundary area 43. The streak density D0 is an ideal value of the streak density, and refers to a state in which there is no difference from the density of the patch, that is, substantially no black streaks or no white streaks are visible.

In the graph, the streak density below D0, that is, at the high density side of the graph, corresponds to the black streaks, and the streak density above D0, that is, at the low density side of the graph, corresponds to the white streaks. Such streak density can be said to represents a deviation amount between the first patch 41 and the second patch 42 in the transport direction D2. After obtaining the streak densities for each TP 40a, 40b, 40c, 40d, and 40e of the first TP group 44, the adjustment value calculation section 12b calculates an approximate line for these streak densities. According to FIG. 8A, the approximate line F1 is calculated from the streak densities for each TP 40a, 40b, 40c, 40d, and 40e by the least-squares method.

Figure 8B:
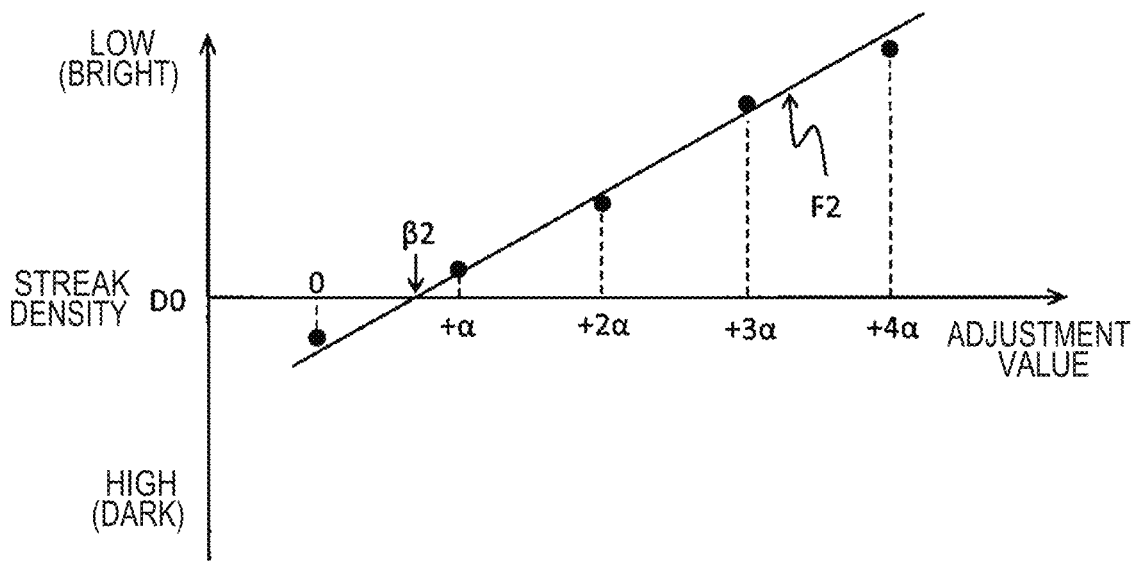
FIG. 8B is a graph showing the streak density obtained from the reading results of a second TP group.

FIG. 8B shows the streak density obtained from the reading result of the second TP group 45 recorded on the medium 30. The interpretation of FIG. 8B is the same as in FIG. 8A, so common explanations are omitted. After obtaining the streak densities for each TP 40a, 40b, 40c, 40d, and 40e of the second TP group 45, the adjustment value calculation section 12b calculates an approximate line for these streak densities. According to FIG. 8B, the approximate line F2 is calculated from the streak densities for each TP 40a, 40b, 40c, 40d, and 40e by the least-squares method.

In step S190, the adjustment value calculation section 12b obtains β1 as an adjustment value when the streak density of the approximate line F1 is D0. According to FIG. 8A, the adjustment value β1 is larger than +2α and smaller than +3α. The adjustment value β1 is the adjustment value for the first distance L1, which is derived by focusing on the recording results of the first TP group 44. Similarly, the adjustment value calculation section 12b obtains β2 as an adjustment value when the streak density of the approximate line F2 is D0. According to FIG. 8B, the adjustment value β2 is larger than 0 and smaller than +α. The adjustment value β2 is an adjustment value for the first distance L1, which is derived by focusing on the recording results of the second TP group 45.

As can be seen from the previous explanations, the adjustment value β1 is affected by the errors in the transport amount that occurred in the first paper feed in step S110. On the other hand, the adjustment value β2 is affected by the errors in the transport amount that occurred in the first paper feed in step S150. Therefore, the adjustment value calculation section 12b calculates and stores an adjustment value βav, which is the average of the adjustment values β1 and β2. By the above, the flowchart in FIG. 4 ends.

The adjustment value βav can be said to be an adjustment value that cancels out the errors in the transport amount that occur in the first paper feed in step S110 and the first paper feed in step S150 due to transport roller errors, and also optimizes the first paper feed by the transport section 17 to avoid generation of black streaks and white streaks as much as possible. In other words, the TP recording control of steps S100 to S160 is a process of recording a plurality of TP groups suitable for calculating such an adjustment value βav. Thereafter, during the recording process of an image selected arbitrarily by the user, the control section 11 adopts the adjustment value βav and instructs the transport section 17 to use the "first distance L1+βav" as the paper feed amount each time. As a result, it is possible to obtain a favorable recording quality with no or almost no black or white streaks occurring in the boundary area between each band-sized image recorded on the medium 30 in each pass.

3. Modified Example

Some of the modifications included in this embodiment will be described. A case in which the circumference length of the transport roller is N times the first distance L1 will be explained. N is an integer of 2 or more. The fact that the circumference length of the transport roller is N times the first distance L1 naturally means that following relationship is true: (circumference length of transport roller)>(first distance L1) In such a case, the control section 11 records, in the TP recording control, N sets of the TP groups, including the first TP group 44 and the second TP group 45, at different positions in the transport direction D2 on the medium 30.

Figure 9:
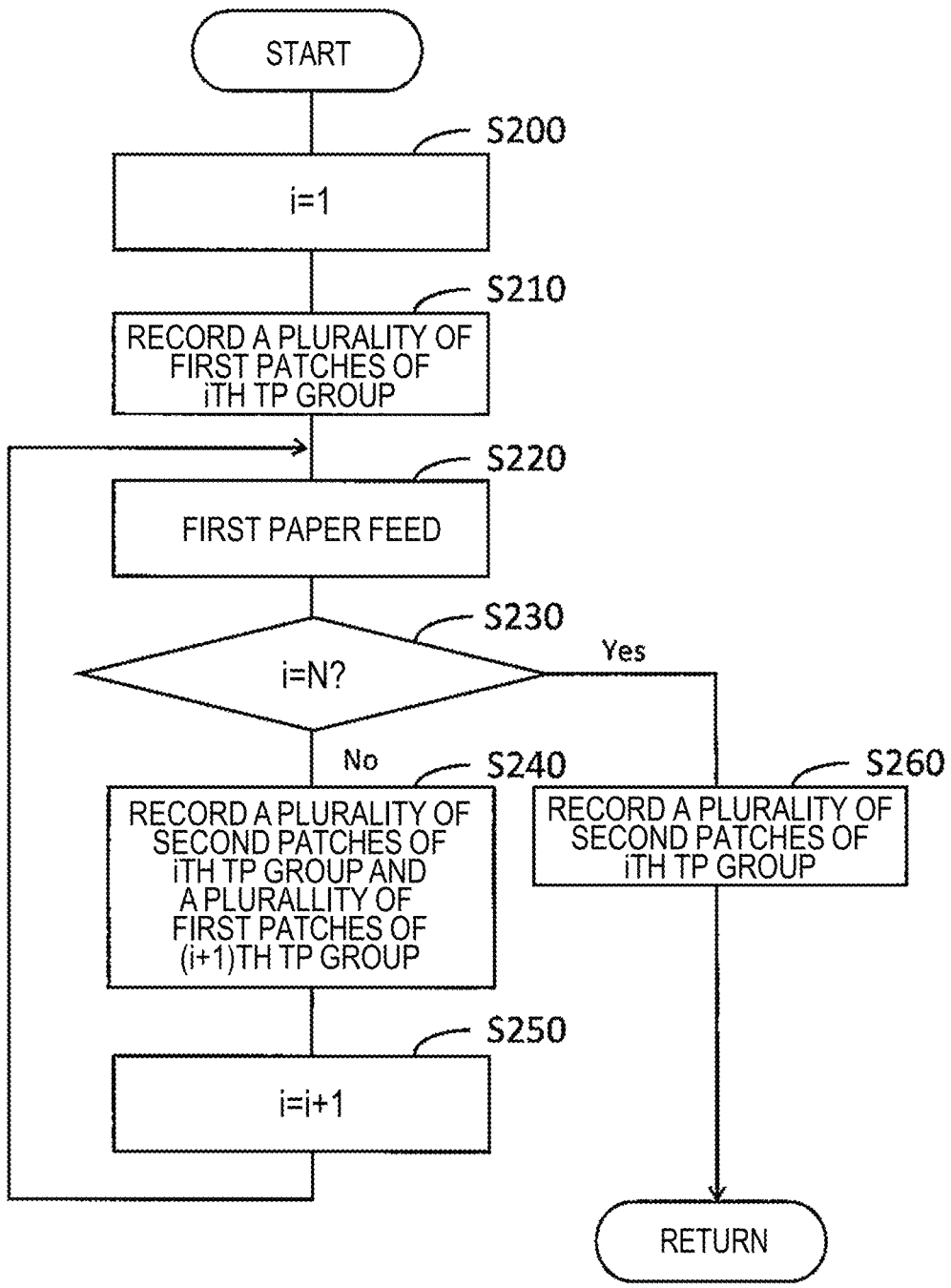
FIG. 9 is a flowchart showing the TP recording control when a circumference length of the transport roller is N times a first distance.
Figure 10:
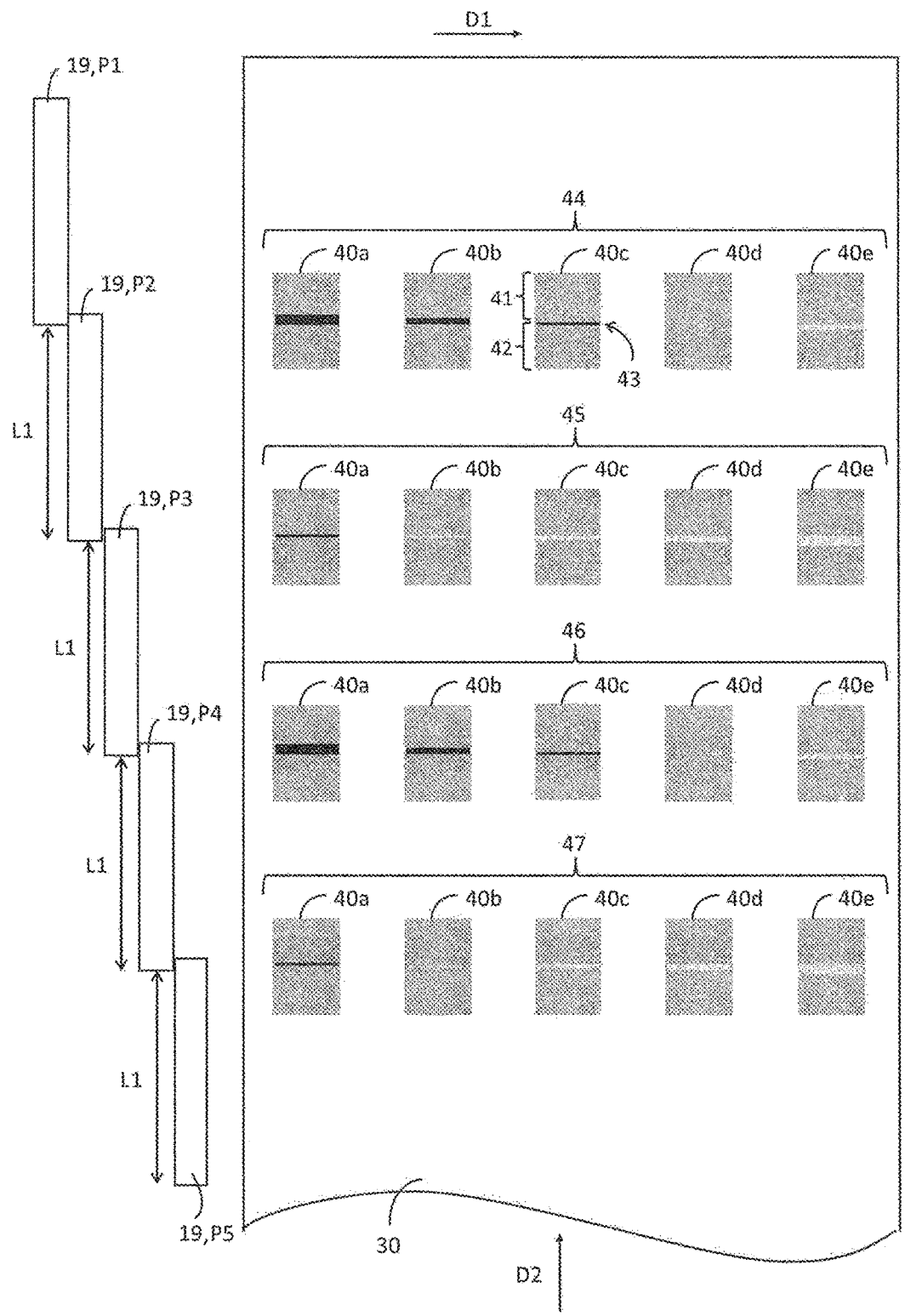
FIG. 10 is a diagram showing a state in which a plurality of TP groups is recorded on the medium by the TP recording control of FIG. 9.

FIG. 9 shows a flowchart of the TP recording control when the circumference length of the transport roller is N times the first distance L1. If the circumference length of the transport roller is N times the first distance L1, the control section 11 executes the flowchart of FIG. 9 instead of steps S100 to S160 of FIG. 4. FIG. 10 shows a state in which a plurality of TP groups is recorded on the medium 30 by the recording head 19 in the TP recording control of FIG. 9, from the same viewpoint as in FIG. 2. For the interpretation of FIG. 10, the interpretation of FIG. 5 will be applied appropriately, and explanations common to those of FIG. 5 will be omitted. In FIG. 10, the description of the adjustment values for each TP 40a, 40b, 40c, 40d, and 40e is omitted, but this can be understood in the same way as in FIG. 5. In the following description of FIG. 9 and FIG. 10, it is assumed that N=4 as an example.

In step S200, the TP recording control section 12a sets a variable i, which indicates the number of the TP group, to 1 as an initial value. In step S210, the TP recording control section 12a controls the carriage 18 and the recording head 19 to record a plurality of first patches of the i-th TP group onto the medium 30. The i-th TP group in step S210 is the first TP group, so step S210 is the same process as step S100 in FIG. 4.

In step S220, the TP recording control section 12a instructs the transport section 17 to transport the first distance L1 to perform the first paper feed. Step S220 is the same process as step S110 or step S150 in FIG. 4. After step S220, in step S230, the TP recording control section 12a determines whether the number of the current variable i is equal to N. If the number i has not reached N, the process proceeds to step S240 according to the judgment "No" in step S230. If the number of i=N, the process proceeds to step S260 according to the judgment "Yes" in step S230.

In step S240, the TP recording control section 12a controls the carriage 18 and the recording head 19 to record a plurality of second patches of the i-th TP group and a plurality of first patches of the (i+1)th TP group onto the medium 30. The printing method for the plurality of second patches in one TP group has already been described. In other words, the recording of the plurality of second patches of the i-th TP group and the recording of the plurality of first patches of the (i+1)th TP group are recorded simultaneously in a single pass. According to FIG. 10, the path P2 causes the recording of the second patches 42 for each TP 40a, 40b, 40c, 40d, and 40e in the first TP group 44 and the recording of the first patches 41 for each TP 40a, 40b, 40c, 40d, and 40e in the second TP group 45. In this way, as an exception, the TP recording control described in FIG. 9 and FIG. 10 has no second paper feed in this embodiment.

In step S250, the TP recording control section 12a increments the number of the variable i. In other words, the number of the variable i is updated by adding 1 to the current number of the variable i. After step S250, the first paper feed of step S220 is performed and the process proceeds to a decision of step S230. According to this process flow, as shown in FIG. 10, after the pass P2 and then the first paper feed, the pass P3 causes the recording of the second patches 42 for each TP 40a, 40b, 40c, 40d, and 40e in the second TP group 45, and the recording of the first patches 41 for each TP 40a, 40b, 40c, 40d, and 40e of the third TP group 46. Similarly, after the pass P3 and then the first paper feed, the pass P4 is causes the recording of the second patches 42 for each TP 40 a, 40b, 40c, 40d, and 40e in the third TP group 46, and the recording of the first patches 41 for each TP 40a, 40b, 40c, 40d, and 40e in the fourth TP group 47.

In step S260, which is proceeded to from step S230, the TP recording control section 12a controls the carriage 18 and the recording head 19 to record a plurality of second patches of the i-th TP group onto the medium 30. In other words, according to FIG. 10, after the pass P4 and then the first paper feed, the pass 5 causes the recording of the second patches 42 for each TP 40a, 40b, 40c, 40d, and 40e in the fourth TP group 47. "N", that is, the four TP groups 44, 45, 46, and 47 shown in FIG. 10, are TP groups that are all recorded in the same way, except for the recording position on the medium 30 in the transport direction D2. However, in each of the TP groups 44, 45, 46, and 47, the "actual transport amount" by the first paper feed in step S220, which is performed between the recording of the first patches 41 and the second patches 42, is different due to the transport roller errors. Therefore, the densities of the boundary areas 43 are also different for each of the TP groups 44, 45, 46, and 47.

After step S260, the control section 11 should execute processes from step S170 and thereafter in FIG. 4. In other words, the adjustment value calculation section 12b obtains reading data of the medium 30 on which the first TP group 44, the second TP group 45, the third TP group 46, and the fourth TP group 47 are recorded. Then, an approximate line is calculated based on the streak density of the boundary area 43 of each TP of each of the first TP group 44, the second TP group 45, the third TP group 46, and the fourth TP group 47, an adjustment value is calculated from the calculated approximate lines for each of the first TP group 44, the second TP group 45, the third TP group 46, and the fourth TP group 47, an average value of the adjustment values is calculated from these adjustment values for each of the first TP group 44, the second TP group 45, the third TP group 46, and the fourth TP group 47, and then the calculated average value is stored as an adjustment value βav.

In the TP recording control, the control section 11 may record a "marker" indicating the location of the boundary area 43 together with the TP. Referring to FIG. 5, the TP 40d of the second TP group 45 is recorded on the media 30 together with a marker pattern 50 outside the TP 40d. The marker pattern 50 is a specific example of a marker, and is a ruled line located near the boundary area 43 of the corresponding TP 40*d* and having a length component in the main scanning direction D1.

The TP recording control section 12*a*, for example, controls the recording head 19 at the timing of recording the first patch 41 of TP 40*d* of the second TP group 45, and can record one of the marker patterns 50 to the outside of the first patch 41 using the nozzle 20 that is furthest upstream from amongst the nozzles 20 being used when the recording the first patch 41, or a nozzle 20 one or two nozzles downstream from that nozzle 20. Similarly, the TP recording control section 12*a* can record, at the timing of recording the second patch 42 of the second TP of the TP40*d* group 45, one of the marker patterns 50 to the outside of the second patch 42 using the nozzle 20 that is further downstream from amongst the nozzles 20 being used when recording the second patch 42, or a nozzle 20 on one or two nozzles upstream from that nozzle 20.

Although not illustrated in all of the TPs, needless to say, a marker such as the marker pattern 50 can be recorded in the same way for all of the TPs 40*a*, 40*b*, 40*c*, 40*d*, and 40*e* shown in FIG. 5 and FIG. 10. The fact that the marker pattern 50 is recorded with the TPs enables the adjustment value calculation section 12*b* to efficiently and accurately obtain the streak density of the boundary area 43 for each TP from the reading data, by using the marker pattern 50 for each TP as a landmark when the reading data of multiple TP groups is acquired.

The marker pattern 50 is also useful when the user visually evaluates the multiple TP groups recorded on the medium 30. The user can recognize the position near the marker pattern 50 in the TPs as the boundary area 43 and determine whether the black or white streaks occur in the boundary area 43. When the user visually evaluates the TP groups, the user selects a TP of good image quality with the least noticeable black and white streaks for each TP group, and inputs the selection result to the control section 11 through the operation section 14. The adjustment value calculation section 12*b* may recognizes the adjustment value corresponding to the TP selected by the user as an appropriate adjustment value for each TP group. Then, the average value of such appropriate adjustment values for each TP group is obtained, and this average value can be used as the adjustment value βav.

The marker to be recorded with the TP should appropriately indicate the location of the boundary area 43 in the TP. Therefore, in addition to ruled lines such as the marker patterns 50, various other forms of maker can be considered, such as marks of specific shapes or colors, specific character strings, and so on.

4. Summary

As described above, according to this embodiment, the recording device 10 includes a recording head 19 that has a nozzle array with a plurality of nozzles 20 arranged in a predetermined nozzle alignment direction D3, the nozzles being configured to eject liquid onto a medium 30, and that ejects liquid while moving in a first direction that intersects the nozzle alignment direction D3 to perform recording; a transport section 17 that has a transport roller configured to rotate to transport the medium 30 and that transport the medium 30 in a second direction that intersects the first direction; and a control section 11 that controls recording by the recording head 19 and transport by the transport section 17. A circumference length of the transport roller is different from a nozzle array length which is a length of the nozzle array in the second direction. The control section 11 performs TP recording control to record, on the medium 30, a group of TPs, in which a plurality of TPs including a first patch 41 and a second patch 42 with different positions in the second direction are arranged in the first direction and in which an amount of liquid ejected for a boundary area 43 between the first patch 41 and the second patch 42 is different in the first direction for each TP. The control section 11, in the TP recording control, records a first TP group 44 and a second TP group 45, which are the TP groups, at different positions in the second direction onto the medium 30, transports the medium 30 by a first distance L1 based on the nozzle array length as a transport between the recording of the first patch 41 and the second patch 42 of the TP, and transports the medium 30 by a second distance L2, which is a difference between an integral multiple (n times) of the circumference length and twice the first distance L1, as a transport between the recording of the second patch 42 of the first TP group 44 and the recording of the first patch 41 of the second TP group 45.

Since the circumference length of the transport roller is different from the nozzle array length, the actual transport amount of transport in response to the instruction for the first distance L1 based on the nozzle array length can easily vary due to the transport roller errors. In this embodiment, in such a situation, the first TP group 44 and the second TP group 45 are recorded at different positions in the second direction as described above. By recording the TP, it can be said that the effect of transport roller errors can now be eliminated as much as possible to obtain the correct transport volume adjustment value.

Further, according to this embodiment, when a plurality of the transport rollers is located along the second direction, the control section 11 sets the second distance L2 as the difference between a common multiple of circumference lengths of the plurality of transport rollers and twice the first distance L1. If there is more than one transport roller, then the transport rollers are regarded as one virtual transport roller. In other words, the control section 11 can calculate the second distance L2 by treating the common multiple of the circumference lengths of multiple transport rollers as the circumference length of one virtual transport roller. In this case, n=1 basically. However, in some cases, the value of n may be higher than 2, and the second distance L2 may be obtained by following formula:

(the least common multiple of the circumference length of the multiple transport rollers×2)−(first distance $L1×2$)

Since two times the least common multiple and three times the least common multiple are still common multiples, the second distance L2 is ultimately obtained by the same formula:

(the common multiple of the circumference lengths of multiple transport rollers)−(first distance $L1×2$)

According to this configuration, even if the transport section 17 has a plurality of transport rollers, the TPs can be recorded to eliminate the effects of errors in each transport roller, which helps to obtain the correct adjustment value of the transport amount.

According to this embodiment, when the circumference length of the transport roller is N times the first distance L1 (where N is an integer of 2 or more), the control section 11 may record N number of TP groups, including the first TP group 44 and the second TP group 45, at different positions in the second direction on the medium 30 in the TP recording control. According to the above configuration, the N number of TP groups can be recorded in the process of making one rotation of the transport roller by eliminating the transport of the second distance L2 as an exception and executing transport by instructing the first distance L1 N number of times. Since the transport errors caused by the transport roller errors vary even within one cycle of the transport roller, recording more TP groups will lead to obtaining more appropriate adjustment values.

According to this embodiment, the control section 11 may record the marker indicating the location of the boundary area 43 together with the TP in the TP recording control. According to the above configuration, the markers, which indicate the location of the boundary area 43, will improve efficiency and accuracy when the control section 11 detects the position and the density of the boundary area 43 from the reading data of the TP group, or when the user visually evaluates the boundary area 43. This avoids that the control section 11 wastefully detects the position and the density of the boundary areas 43, saving processing time and memory consumption.

According to this embodiment, in the TP recording control, the control section 11 may record a plurality of TPs forming a TP group at equal intervals in the first direction. Assuming that the difference in positions in the first direction is also one of the causes that affect the density of the TPs on the medium 30, then when calculating the adjustment value for each TP group from the approximate line of the streak density in the boundary area 43 of each TP, the accuracy of the calculated adjustment value is better if the TPs are equally spaced in the first direction.

This embodiment discloses various categories of embodiments, including not only things such as recording devices and systems, but also methods they execute, and programs 12 that cause a processor to execute the methods. For example, in a recording method of the recording device 10, the recording device 10 has a recording head 19 that has a nozzle array with a plurality of nozzles 20 arranged in a predetermined nozzle alignment direction D3, the nozzles being configured to eject liquid onto a medium 30, and that ejects liquid while moving in a first direction that intersects the nozzle alignment direction D3 to perform recording; a transport section 17 having a transport roller that rotates to transport the medium 30 and transport the medium 30 in a second direction that intersects the first direction, wherein a circumference length of the transport roller is different from a nozzle array length, which is a length of the nozzle array in the second direction, the recording method includes a TP recording step for recording, on the medium 30, a group of TPs, in which a plurality of TPs including a first patch 41 and a second patch 42 with different positions in the second direction are arranged in the first direction, and in which an amount of liquid ejected for a boundary area 43 between the first patch 41 and the second patch 42 is different for each TP in the first direction. In the TP recording step, the recording method records on the medium 30 a first TP group 44 and a second TP group 45, which are TP groups, at different positions in the second direction, transports by a first distance L1 based on the nozzle array length as a transport between the recording of the first patch 41 and the second patch 42 of the TP, and transports by a second distance L2, which is a difference between an integer multiple of the circumference length and two times the first distance L1, as a transport between the recording of the second patch 42 of the first TP group 44 and the recording of the first patch 41 of the second TP group 45.

In the previous explanation, when recording TP groups in which the amount of liquid ejected for the boundary areas 43 between the first patches 41 and the second patches 42 is different for each TP 40*a*, 40*b*, 40*c*, 40*d*, and 40*e* in the first direction, the control section 11 differs the positional relationship between the first patches 41 and the second patches 42 in the second direction using the adjustment values for each TP 40*a*, 40*b*, 40*c*, 40*d*, and 40*e*. However, the method of recording the TP groups where the amount of liquid ejected to the boundary areas 43 differs for each TP 40*a*, 40*b*, 40*c*, 40*d*, and 40*e* in the first direction is not limited to this type of position adjustment.

For example, the control section 11 makes the positional relationship between the first patches 41 and the second patched 42 in the second direction the same for all of the plurality of TPs 40*a*, 40*b*, 40*c*, 40*d*, and 40*e* in one TP group. That is, when recording the second patches 42 as described above, no region of unused nozzles 20 is provided. Then, the control section 11 varies the amount of the ink ejection to the boundary area 43 for each TP 40*a*, 40*b*, 40*c*, 40*d*, and 40*e* according to the adjustment value for each TP 40*a*, 40*b*, 40*c*,40*d*, and 40*e*. For example, a TP with a smaller adjustment value will reduce the number of dots ejected by the nozzles 20 that are predetermined as the nozzles 20 to be used for recording the boundary area 43, and a TP with a larger adjustment value will increase the number of dots ejected by the nozzles 20 used for recording the boundary area 43. According to this configuration, the adjustment value is not an adjustment value for the transport amount of the transport section 17, but an adjustment value for the amount of ejection with respect to the nozzles 20 used to record the boundary area 43.

The transport roller does not have to be in contact with the medium 30 to transport it. For example, the transport rollers may be a configuration to rotate to move belts or pallets, and the medium 30 may be transported on these belts or pallets.

What is claimed is:

1. A recording device comprising:
a recording head that has a nozzle array with a plurality of nozzles for ejecting liquid onto a medium, the nozzles being arranged in a predetermined nozzle alignment direction, and that ejects liquid while moving in a first direction that intersects the nozzle alignment direction to perform recording;
a transport section that has a transport roller configured to rotate to transport the medium and that transports the medium in a second direction that intersects the first direction; and
a control section that controls recording by the recording head and transport by the transport section, wherein
a circumference length of the transport roller is different from a nozzle array length, which is a length of the nozzle array in the second direction,
the control section
performs TP recording control to record, on the medium, a group of test patterns, in which a plurality of test patterns including a first patch and a second patch with different positions in the second direction are arranged in the first direction and an amount of liquid ejected for a boundary area between the first patch and the second patch is different in the first direction for each test pattern and,
in the TP recording control,
records a first test pattern group and a second test pattern group, which are the test pattern groups, at different positions in the second direction on the medium, transports the medium by a first distance based on the nozzle array length as a transport between the recording of the first patch and the second patch of the test pattern, and transports the medium by a second distance, which is a difference between an integer multiple of the circumference length and two times the first distance, as a transport between the recording of the second patch of the first test pattern group and the recording of the first patch of the second test pattern group.

2. The recording device according to claim 1, wherein: when a plurality of the transport rollers is located along the second direction, the control section sets the second distance as a difference between a common multiple of circumference lengths of the plurality of the transport rollers and two times the first distance.

3. The recording device according to claim 1, wherein: when the circumference length of the transport roller is N times the first distance, N being an integer of 2 or more, the control section, in the TP recording control, records N number of test pattern groups including the first test pattern group and the second test pattern group at different positions in the second direction on the medium.

4. The recording device according to claim 1, wherein: the control section, in the TP recording control, records a marker indicating the location of the boundary area together with the test pattern.

5. The recording device according to claim 1, wherein: the control section, in the TP recording control, records the plurality of test patterns forming the test pattern group at equal intervals in the first direction.

6. A recording method of a recording device, the recording device including
a recording head having a nozzle array with a plurality of nozzles arranged in a predetermined nozzle alignment direction that is configured to eject liquid onto a medium, and eject liquid while moving in a first direction that intersects the nozzle alignment direction to perform recording and a transport section that has a transport roller configured to rotate to transport the medium and that transports the medium in a second direction that intersects the first direction, wherein a circumference length of the transport roller is different from a nozzle array length, which is a length of the nozzle array in the second direction, the recording method comprising:

a TP recording step for recording, on the medium, a group of test patterns, in which a plurality of test patterns including a first patch and a second patch with different positions in the second direction are arranged in the first direction, and in which an amount of liquid ejected for a boundary area between the first patch and the second patch is different for each test pattern in the first direction, wherein the TP recording step records a first test pattern group and a second test pattern group, which are the test pattern groups, at different positions in the second direction on the medium, transports the medium by a first distance based on the nozzle array length as a transport between the recording of the first patch and the second patch of the test pattern, and transports the medium by a second distance, which is a difference between an integer multiple of the circumference length and two times the first distance, as a transport between the recording of the second patch of the first test pattern group and the recording of the first patch of the second test pattern group.

* * * * *